United States Patent
Brückner et al.

(10) Patent No.: US 10,974,485 B2
(45) Date of Patent: Apr. 13, 2021

(54) COMPONENT MADE OF METALLIC COMPOSITE MATERIAL AND METHOD FOR THE MANUFACTURE OF THE COMPONENT BY HOT FORMING

(71) Applicant: Outokumpu Oyj, Helsinki (FI)

(72) Inventors: Gabriele Brückner, Dusseldorf (DE);
Thomas Fröhlich, Ratingen (DE);
Thomas Nentwig, Dusseldorf (DE);
Jasminko Skrlec, Krefeld (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 145 days.

(21) Appl. No.: 15/769,917

(22) PCT Filed: Oct. 31, 2016

(86) PCT No.: PCT/EP2016/076220
§ 371 (c)(1),
(2) Date: Apr. 20, 2018

(87) PCT Pub. No.: WO2017/072357
PCT Pub. Date: May 4, 2017

(65) Prior Publication Data
US 2018/0304583 A1 Oct. 25, 2018

(30) Foreign Application Priority Data
Oct. 30, 2015 (EP) .................................... 15192262

(51) Int. Cl.
*B32B 15/01* (2006.01)
*B32B 1/08* (2006.01)
(Continued)

(52) U.S. Cl.
CPC .............. *B32B 15/011* (2013.01); *B23K 5/00* (2013.01); *B23K 9/00* (2013.01); *B23K 10/00* (2013.01);
(Continued)

(58) Field of Classification Search
CPC ....... C23C 30/00; C23C 30/005; C22C 38/40; C22C 38/18; C22C 38/44; C22C 38/02;
(Continued)

(56) References Cited

U.S. PATENT DOCUMENTS 2,874,082 A  2/1959  Lena et al.
6,564,604 B2  5/2003  Kefferstein et al.
(Continued)

FOREIGN PATENT DOCUMENTS

DE  102014008718 B3  2/2015
EP  1013785 A1  6/2000
(Continued)

OTHER PUBLICATIONS

Therma 314/4841: EN 1.4841, ASTM TYPE 314, downloaded from secure.outokumpu.com on Apr. 27, 2020 (five pages) (Year: 2020).*
(Continued)

*Primary Examiner* — Michael E. La Villa
(74) *Attorney, Agent, or Firm* — The Webb Law Firm

(57) ABSTRACT

A component made of metallic composite material having high corrosion resistance and scale resistance. The metallic composite material contains as a core material an uncoated hardenable steel on which surface a corrosion resistance and scaling resistance layer is provided using heat resistant stainless steel, and has a yield strength $Rp_{0,2}$ of at least 1000 MPa and a tensile strength $R_m$ of at least 1500 MPa for the core material and a critical scaling resistance temperature in air for the layer material is at least 850° C.

14 Claims, 3 Drawing Sheets

(51) Int. Cl.

| | | |
|---|---|---|
| C22C 38/02 | (2006.01) | |
| C22C 38/32 | (2006.01) | |
| C22C 38/44 | (2006.01) | |
| C22C 38/04 | (2006.01) | |
| C22C 38/40 | (2006.01) | |
| C22C 38/18 | (2006.01) | |
| C22C 38/08 | (2006.01) | |
| C22C 38/16 | (2006.01) | |
| C23C 30/00 | (2006.01) | |
| C22C 38/38 | (2006.01) | |
| C22C 38/22 | (2006.01) | |
| C22C 38/12 | (2006.01) | |
| C22C 38/00 | (2006.01) | |
| C22C 38/20 | (2006.01) | |
| B32B 15/18 | (2006.01) | |
| B32B 15/04 | (2006.01) | |
| C21D 8/00 | (2006.01) | |
| C21D 6/00 | (2006.01) | |
| B23K 5/00 | (2006.01) | |
| C21D 8/02 | (2006.01) | |
| B23K 10/00 | (2006.01) | |
| C21D 9/46 | (2006.01) | |
| C21D 8/04 | (2006.01) | |
| C21D 7/13 | (2006.01) | |
| B23K 9/00 | (2006.01) | |
| B23K 26/00 | (2014.01) | |
| C21D 8/12 | (2006.01) | |
| C22C 38/42 | (2006.01) | |
| C22C 38/58 | (2006.01) | |

(52) U.S. Cl.
CPC .............. *B23K 26/00* (2013.01); *B32B 1/08* (2013.01); *B32B 15/04* (2013.01); *B32B 15/043* (2013.01); *B32B 15/18* (2013.01); *C21D 6/001* (2013.01); *C21D 6/002* (2013.01); *C21D 6/004* (2013.01); *C21D 6/005* (2013.01); *C21D 6/007* (2013.01); *C21D 7/13* (2013.01); *C21D 8/00* (2013.01); *C21D 8/0205* (2013.01); *C21D 8/0247* (2013.01); *C21D 8/04* (2013.01); *C21D 8/0447* (2013.01); *C21D 8/1227* (2013.01); *C21D 9/46* (2013.01); *C22C 38/001* (2013.01); *C22C 38/02* (2013.01); *C22C 38/04* (2013.01); *C22C 38/08* (2013.01); *C22C 38/12* (2013.01); *C22C 38/16* (2013.01); *C22C 38/18* (2013.01); *C22C 38/20* (2013.01); *C22C 38/22* (2013.01); *C22C 38/32* (2013.01); *C22C 38/38* (2013.01); *C22C 38/40* (2013.01); *C22C 38/44* (2013.01); *C23C 30/00* (2013.01); *C23C 30/005* (2013.01); *B32B 2307/306* (2013.01); *B32B 2307/714* (2013.01); *C21D 2211/001* (2013.01); *C21D 2251/02* (2013.01); *C22C 38/42* (2013.01); *C22C 38/58* (2013.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/24967* (2015.01); *Y10T 428/26* (2015.01)

(58) Field of Classification Search
CPC ......... C22C 38/04; C22C 38/32; C22C 38/42; C22C 38/58; C22C 38/001; C22C 38/08; C22C 38/12; C22C 38/16; C22C 38/20; C22C 38/22; C22C 38/38; B32B 15/011; B32B 15/04; B32B 15/043; B32B 15/18; B32B 1/08; B32B 2307/306; B32B 2307/714; C21D 2211/001; C21D 2251/02; C21D 8/00; C21D 8/0205; C21D 8/0247; C21D 8/04; C21D 8/0447; C21D 8/1227; C21D 9/46; C21D 6/001; C21D 6/002; C21D 6/004; C21D 6/005; C21D 6/007; C21D 7/13; Y10T 428/12958; Y10T 428/12965; Y10T 428/12972; Y10T 428/12979; Y10T 428/12993; Y10T 428/24942; Y10T 428/2495; Y10T 428/24967; Y10T 428/26; B23K 5/00; B23K 9/00; B23K 10/00; B23K 26/00

See application file for complete search history.

(56) References Cited

U.S. PATENT DOCUMENTS

| | | |
|---|---|---|
| 7,645,404 B2 | 1/2010 | Paar et al. |
| 8,137,819 B2 | 3/2012 | Koseki et al. |
| 8,181,331 B2 | 5/2012 | Brandstatter et al. |
| 8,221,898 B2 | 7/2012 | Becker et al. |
| 8,430,973 B2 | 4/2013 | Bohme et al. |
| 8,535,813 B2 | 9/2013 | Becker et al. |
| 9,284,655 B2 | 3/2016 | Kuhn et al. |
| 9,534,268 B2 | 1/2017 | Ratte |
| 9,975,310 B2 | 5/2018 | Hilfrich et al. |
| 2011/0227400 A1 | 9/2011 | Stich et al. |

FOREIGN PATENT DOCUMENTS

| | | |
|---|---|---|
| EP | 1143029 A1 | 10/2001 |
| EP | 1690606 A1 | 8/2006 |
| EP | 2050532 A1 | 4/2009 |
| FR | 2323492 A1 | 4/1977 |
| JP | 2001219701 A | 8/2001 |
| WO | 2005021822 A1 | 3/2005 |
| WO | 2006040030 A1 | 4/2006 |
| WO | 2008107082 A1 | 9/2008 |
| WO | 2008138729 A1 | 11/2008 |
| WO | 2009135779 A1 | 11/2009 |
| WO | 2010149561 A1 | 12/2010 |
| WO | 2011023418 A1 | 3/2011 |
| WO | 2012146384 A1 | 11/2012 |

OTHER PUBLICATIONS

Material Data Sheet, Steel Grade, 22MnB5, downloaded from steelnavigator.ovako,com on Apr. 27, 2020 (three pages) (Year: 2020).*

* cited by examiner

COMPONENT MADE OF METALLIC COMPOSITE MATERIAL AND METHOD FOR THE MANUFACTURE OF THE COMPONENT BY HOT FORMING

CROSS-REFERENCE TO RELATED APPLICATIONS

This application is the United States national phase of International Application No. PCT/EP2016/076220 filed Oct. 31, 2016, and claims priority to European Patent Application No. 15192262.2 filed Oct. 30, 2015, the disclosures of which are hereby incorporated in their entirety by reference.

BACKGROUND OF THE INVENTION

Field of the Invention

The present invention relates to a component made of a metallic composite material having high corrosion resistance and scale resistance. The invention also relates to a method for the manufacture of the component made of the metallic composite material by hot forming.

Description of Related Art

With the focus on the European $CO_2$ emission regulations which aspire to a significant reduction of the $CO_2$ emissions for passenger cars in the year 2020, lightweight efforts become a key question in manufacturing cars. One way to reduce the car body weight without a whole change in the automotive construction is setting in ultra-high strength and therefore thin materials instead of heavy-walled sheets. The passenger safety increase by using such high strength materials simultaneously and they help the automotive manufacturer to fulfill the safety standards. One type of ultra-high strength materials are the so-called hot forming steels.

Hot forming has been an important manufacturing method for automotive car body engineering in the last decade. The benefits reached from the ability to form very complex parts during the process, having nearly no springback and a high dimensional stability to the point of a high strength in the final hardened component. Typical parts manufactured out of hardenable steels are a-pillars and b-pillars, door side impact beams or underfloor channels.

In general, plates or sheets, cut of hot or cold rolled strips, are heated up over austenization temperature (Ac1) of the material, e.g. in a roller heat furnace, and then are hold at this temperature to soak over the complete material thickness and are then put into a forming tool. In the forming tool the heated plate or sheet is formed to a complex part and simultaneously cooled down because of the contact to the cold tool surface at the room temperature. Because of a material defined cooling rate, the material gets a martensitic hardened structure. When the part is cooled down under martensitic start temperature ($M_s$), the tool will be opened, and the part can be retrieved from the tool.

In spite of the great benefits for the materials to be used in hot forming, there are some disadvantages like scaling or non-corrosion resistance, especially in wet corrosion areas of a passenger car. It has been attempted to decrease such drawbacks. One way for decreasing those drawbacks is special coatings. From the WO publication 2005021822A1 is known a cathodic corrosion protection with zinc/magnesium, from the WO publication 2011023418A1 is known an active corrosion protection with zinc/nickel, from the EP patent application 1143029A1 is known a corrosion protection with zinc/aluminum, from the EP patent application 1013785A1 is known a scaling protection with aluminum/silicon and in the WO publication 2006040030A1 is described an organic matrix with $SiO_2$-base with aluminum particle. All the coatings have a layer thickness between 8 and 35 μm and are applied with galvanizing, electrolytically, physical vapor deposition (PVD) or spray painting.

One general way to combine properties of different sheets together is to create a multilayered composite of the single sheets. So-called multilayer sheets are described in the EP patent application 2050532A1. This patent combines layers of steel sheets where on the one side are layers with a high strength but a low ductility, and on the other side are layers with a low strength but a high ductility. Every layer has a thickness of at most 125 μm, and the number of layers is at least 5.

The WO publication 2008138729A1 describes a multilayer composite part which combines a soft core material with high strength layers, and the surface layers have a good paintability and outer-skin quality.

The WO publication 2012/146384 relates to a hot-formable steel strip, which comprises a steel substrate and an oxidation resistant metallic clad layer on one of both sides of the steel substrate. The steel substrate is carbon steel containing less than 1.0 weight % chromium, and the oxidation resistant metallic layer is a stainless steel selected from the group consisting of martensitic stainless steel, ferritic stainless steel or austenitic stainless steel. However, the preferred oxidation resistant clad layer is made of titanium, aluminium or copper. Further, the clad layer is very thin, at maximum 30 micrometer, and is thus difficult to weld with other materials during a component manufacturing. In such dissimilar combinations brittle behavior will result with imperfections in the weld like titanium carbides, different FeAl-phases or hot cracks because of liquid copper phases. At all it will be critical to create a weld by typical automotive welding methods like resistance spot welding because of the different physical properties like thermal expansion or heat conduction.

The U.S. Pat. No. 2,874,082 describes a composite assembly having a core of an air hardening hot work carbon steel and a coating of austenitic stainless steel. The austenitic stainless steel for cladding is selected so that the austenitic stainless steel has essentially similar strength values as the core steel. The operating temperature range is low, at the maximum about 1000° F., i.e. about 538° C.

The JP patent publication 2001219701A and the US patent application 2011227400A1 describe the usage of a three layer steel composite in a disc break wheel for a motor vehicle.

The WO publication 2009135779A1 describes the usage of a three-layer steel composite for automotive parts, in which the composite material comprises a soft material as a core material and high strength materials for the surface layers.

The FR patent application 2323492A1 describes a manufacturing method to plate two chromium-nickel steel blocks on carbon steel. The way how to fix the plates by welding and then rolling with multiple pistons is described. Another patent application which describes a manufacturing way of a multilayer steel composite is described in the EP patent application 1690606A1, which method relates to the production of roll cladded hot-rolled strips. Particularly, the different possibilities of eroding surface pretreatment are mentioned to put the different plates together like pickling, etching, brushing, polishing, grinding, sanding, shot peening, grit blasting, milling or planning.

The WO publication 2008107082A1 describes a method for improving the temperature and corrosion resistance of stainless steel using chemical treatment with an aqueous solution. The method is applied for the non heat-resistant and non scaling-resistance stainless steels 1.4301 and 1.4016.

Typical hardenable materials are manganese-boron alloyed steels. Hardenable stainless steels are known from the patent WO2010149561A1.

SUMMARY OF THE INVENTION

The object of the present invention is to eliminate some drawbacks of the prior art and to achieve a component made of a metallic composite material having high corrosion resistance and scale resistance and a method for the manufacture by hot forming.

The metallic composite material for a component according to the invention consists of a core material which core material is covered on the outer surface with a layer material. The metallic composite material contains as a core material an uncoated hardenable steel on which surface a corrosion resistance and scaling resistance layer is achieved using heat resistant stainless steels as the layer material for the uncoated hardenable steel.

The mechanical values after a hot forming process for the core material in the metallic composite material according to the invention are preferably so that the yield strength $R_{p0,2}$ is at least 1000 MPa and the tensile strength $R_m$ is at least 1500 MPa. The chemical composition of the hardenable core material is preferably by mass % up to 0.48% C, up to 0.4% N, up to 18% Cr, preferably 10.5-18% Cr, up to 8% Ni, up to 18% Mn, up to 3.0% Mo, up to 1.0% Si, up to 0.65% Cu, up to 0.005 B, the rest being Fe and inevitable impurities. The core material can be based on a 1.4034 martensitic stainless steel having the chemical composition by mass % 0.4-0.52% C, 14.0-15.5% Cr, 0.95-1.25 Mn, the rest being Fe and inevitable impurities. The core material can also be based on a 1.4006 martensitic stainless steel having the chemical composition by mass % 0.07-0.18% C, 11.0-13.5% Cr, 0.95-1.25% Mn, the rest being Fe and inevitable impurities. One alternative for the core material is a 1.4028 martensitic stainless steel containing by mass % 0.25-0.35% C, 12.0-14.0% Cr, the rest being Fe and inevitable impurities. The core material can have the chemical composition by mass % 0.220-0.245% C, 0.15-0.25% Si, 1.05-1.55% Mn, 0.002-0.004% B, the rest being Fe and inevitable impurities, this chemical composition representing a 1.5528 carbon steel.

The layer material according to the invention is a stainless steel which has a critical scaling temperature of resistance in air at least 850° C., and the layer material has high temperature strength of at least 30 MPa for ferritic stainless steels and at least 90 MPa for austenitic stainless steels at the temperature 900° C. The layer material can be an austenitic heat resistant stainless steel containing by mass % 18-25% Cr, 10-19% Ni, Mn≥0.5% and Si≥0.4%. The layer material can also be a ferritic heat resistant stainless steel containing by mass % 13-18% Cr, Mn 0.5%, Si≥1.0% and C≤0.1%. Particularly, austenitic stainless steel is very suitable for welding with a heat-treatable steel.

The layer material is in the shape of a hot rolled strip or a hot rolled plate having a thickness at most 55 mm on a slab with a thickness of 220 mm. In the case of a hot rolled strip the mutual thickness ratio between the layer material and the core material is at most 50% of the total thickness. The layer material can also be in the shape of a cold rolled strip having a thickness at most 2.5 mm. In the case of a cold rolled strip the mutual thickness ratio between the layer material and the core material is at most 3.2% for a slab with a thickness of 160 mm, and then the total thickness of 5 mm for the layer material on both sides of the slab.

The thickness of the layer material in the composite material of the invention is dependent on the final use of the material. When the material is used in atmosphere where high corrosion resistance is required, the layer material has a thickness between 0.25 mm and 0.50 mm, preferably between 0.30 mm and 0.35 mm. In this case the mutual ratio of the layer material to the core material is at most 0.4. When the material is used in thin-sheet solutions where non-scaling properties are required, the layer material has a thickness between 0.05 mm and 0.35 mm, preferably between 0.15 mm and 0.20 mm, the mutual ratio of the layer material to the core material being then at most 0.2.

According to the invention the mutual ratio of the thermal conductivity between the layer material and the core material is at most 2. The layer material is connected on the surfaces of the core material by laser welding. According to the invention electrobrightening is used to have a defined roughness for the layer material.

In the case of electrobrightening the layer material is preconditioned before the hot forming process in the electrolytic solution consisting of a 96% sulfur acid and 85% orthophosphoric acid, both with the same portion of volume. After electrobrightening the layer material is neutralized and then washed up with water. The defined adjusted roughness of the layer material ensures on one side to the outer contact area a high corrosion resistance because of increasing the passivation of the stainless steel material. On the other side with the contact area to the core material, the defined roughness ensures a high adhesion force with the core material. Additionally the passivation of the contact area helps to avoid scaling and increases the adhesion force during the hot rolling process.

When using laser welding for fitting the layer material with the core material according to the invention the laser beam weld process is used as a lap joint and with the process variant of keyhole welding is used. In case of laser beam welding an edge preparation is not necessary and a filler metal, either. An optionally low vacuum atmosphere increases the weld depth, decreases the thermic distortion and improves the seam geometry. Package thicknesses (weld depth) of 35 mm can be reached. Further, it is not necessary to preheat the layer material before welding.

The hot forming process in connection with the method for the manufacture of the composite material of the invention contains the steps first heating to the austenization temperature in a furnace, transferring the composite material from the furnace to the forming tool, hardening and cooling in the forming tool and then cooling down the composite material to the room temperature. In accordance with the invention both hot forming procedures, the direct hot forming as well as the indirect hot-forming, are possible to be utilized. In the indirect procedure there is a forming process of the component and after that the component will be hardened in a separate second step. When alloying the surface of the composite material according to the invention, time is advantageously not required for diffusion of the coating with the layer material.

According to the invention after a hot forming heat treatment at the austenization temperature of 900-975° C. at most 5 minutes the surface roughness of the composite material is $R_a$=0.05-3.00, preferably 2.2-2.8 for pickled hot-strip material, and $R_a$=0.1-0.35 for cold rolled plates, and $R_t$=1.5-18.0, preferably 14.0-17.5 for pickled hot-strip material and $R_t$=1.65-2.65 for cold rolled plates. Further, there is no formation of iron-base layers, such as FeAl, during the hot forming process when having the layer material and the core material in accordance with the invention, and therefore, it is possible to achieve heating curves at least 50 K/s on a conductive or inductive way when the composite material is heated for hot forming. The composite material is retrieved from the hot forming tool during the cool-down process when the martensitic start temperature ($M_s$) of the layer material is reached. In accordance with the invention it is achieved a homogeneous and closed stainless protection layer on the surface of the composite material without any lifts/break-ups and inequalities.

BRIEF DESCRIPTION OF THE DRAWINGS

The present invention is described in more detail referring to the drawings where.

DESCRIPTION OF THE INVENTION

Figure 1:
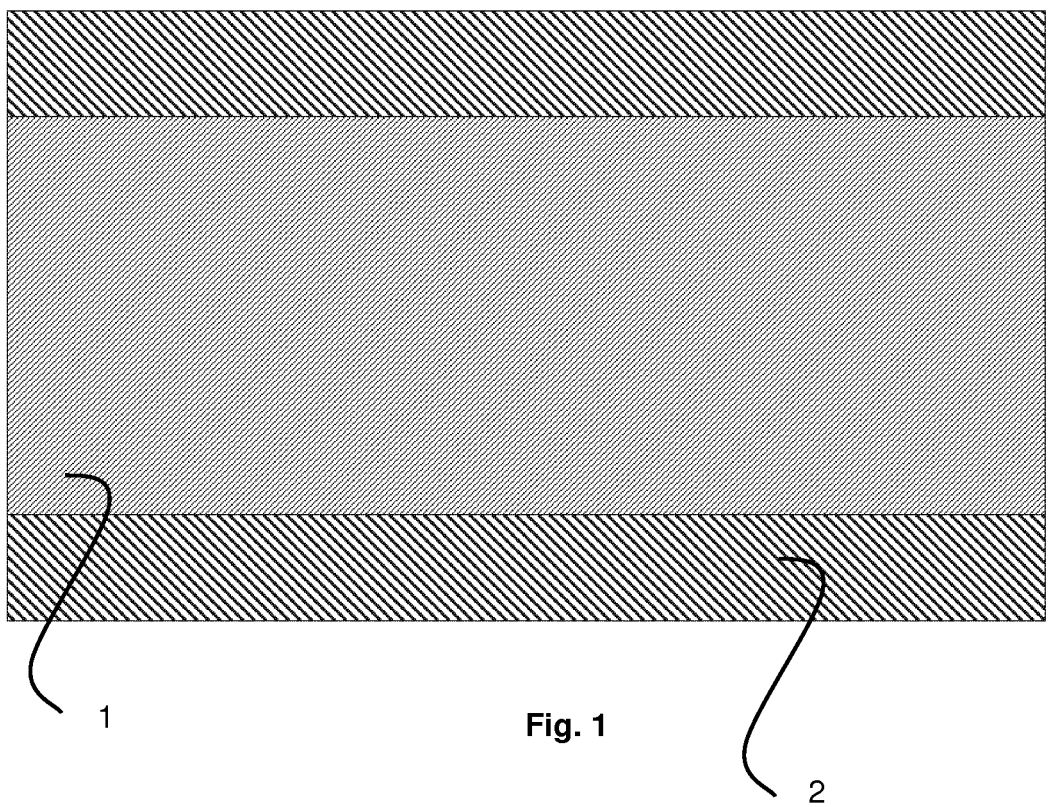
FIG. 1 illustrates as one preferred embodiment of the invention a cut piece of the composite material schematically from the side view.

The invention achieves a new kind of corrosion and scaling protection layer for a hardenable steel during a hot forming process. The structure is shown in FIG. 1. The core material 1 is covered on its surfaces with a layer material 2.

Figure 2:
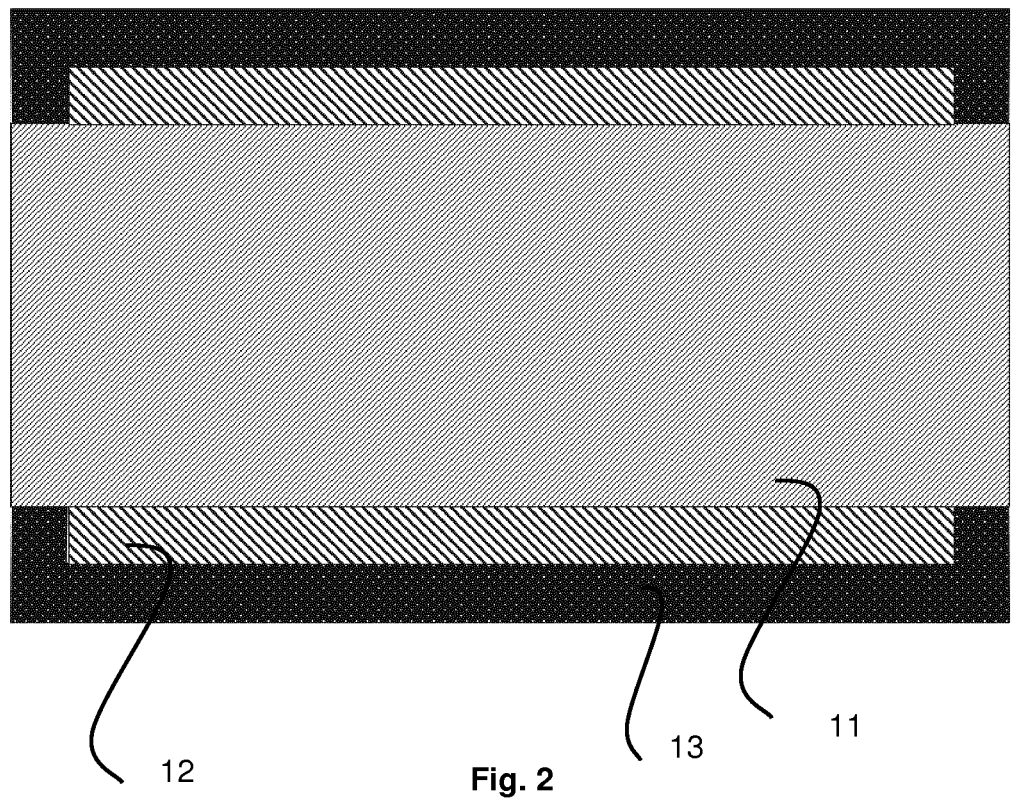
FIG. 2 illustrates as another preferred embodiment of the invention a cut piece of the composite material schematically from the side view.

According to the FIG. 2 the core material 11 is covered on its surfaces with a nitride hardening surface 12. The nitride hardening surface 12 is made of the layer material 13, which is positioned between the core material 11 and the nitride hardening surface 12.

Figure 3:
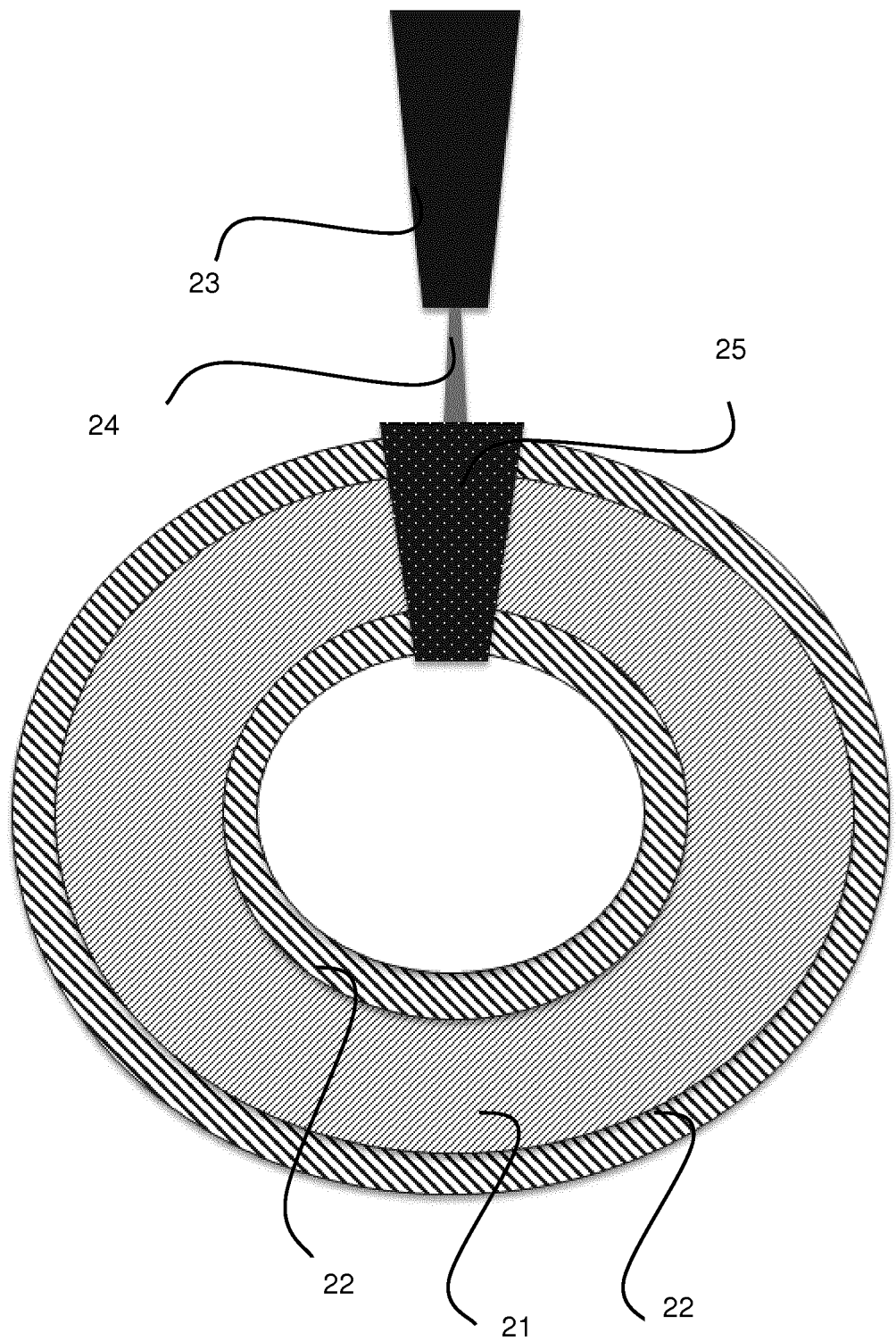
FIG. 3 illustrates still another preferred embodiment of the invention schematically seen as a cross-sectional view.

FIG. 3 shows the composite material of the invention used in a tubular shape. The core material 21 is covered on its outer surface and on its inner surface with a layer material 22. FIG. 3 also show a laser welder 23, the laser beam 24 and the weld seam 25 achieved with laser welding.

On the basis of the non-scaling of the layer material during the hot forming process of the composite material of the invention it is achieved a better paintability for a cathodic dip coating process with a better paint adhesion, resistance against lattice cut and stone chipping influenced corrosion attack as well as a better behavior against cathodic disbanding and a better corrosion resistance. Further, using the composite material and the manufacturing method it is not required to make a post-treatment of the surface with brushing, grinding or polishing to remove unwanted oxides or scale.

Figure 4:
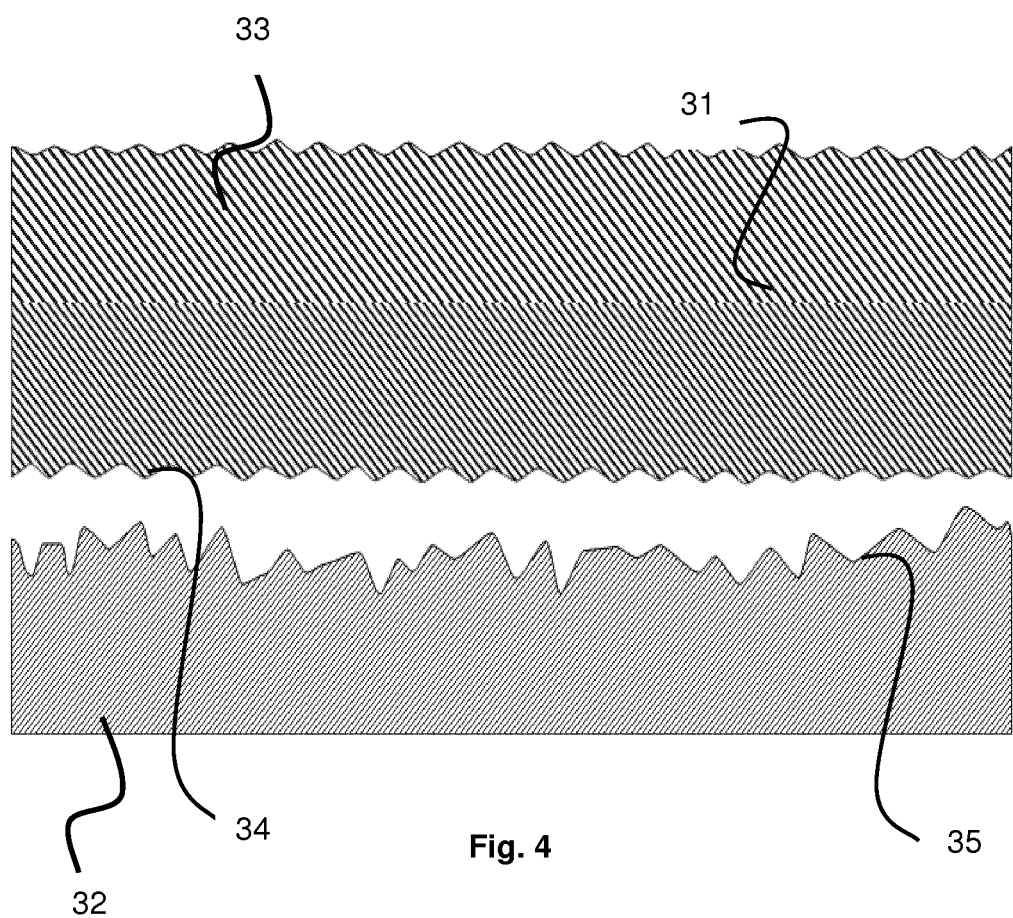
FIG. 4 illustrates the surface of the layer material after electrobrightening and the surface of the core material schematically from the side view.

FIG. 4 illustrates the layer material 31 and the core material 32. The defined roughness of the layer material surface 33 is achieved by electrobrightening in order to ensure a high corrosion resistance in wet corrosion areas and to ensure a high paintability with dip coatings. The defined roughness of the layer material surface 34 is also achieved by electrobrightening in order to ensure a high adhesion force with the core material 32. The reference number 35 shows the undefined, uncoated and not prepared surface of the hardenable core material 32.

The invention has the solution field in the wet corrosion areas of automotive passenger cars or commercial vehicles. The layer material made of stainless steel has a much higher melting point than the hot forming austenization temperature and, therefore, no adhesion is achieved with the ceramic kiln roller of the roller head furnaces. Further, cost-intensive anticorrosion primer, often used for sheets in the automotive industry, is not necessary.

The layer material made of heat resistant stainless steel in accordance with the invention means high temperature strength and thus also high stiffness of the hardened sheet at temperatures above 250° C. The heating of the composite material up to the austenization temperature can be accelerated because no Fe-phases, such as FeAl, are generated on the surface of the layer material. Further, when the core material is a martensitic stainless material, the forming tool after heating can be opened at high temperature that increases the clock frequency, i.e. speeds up the production, during the component production. This means cost savings for the manufacturer. Based on the properties of the layer material the usage of conductive or inductive processes is possible in heating.

The high electrochemical corrosion potential of the layer material in accordance with the invention enables an enduring corrosion protection instead of a zinc coating which only represents a sacrificial anode. The high electrochemical corrosion potential is important especially for wet corrosion areas of an automotive car body, such as a passenger car as well as a transporter or other commercial vehicles.

In case that the layer material of the invention is of austenitic stainless steel, the austenitic microstructure results in a ductility of the weld seam. This means that the layer material has high weldability with no brittle phases or hardness increase, better fatigue behavior in the weld seam.

In accordance with the method of the invention during the heating process of the composite material it is, if desired, to use an atmosphere of a shielding gas or an atmosphere of a combination of shielding gases, such as nitrogen, argon or helium. The shielding gas atmosphere increases the wear resistance of the layer material, which is practical, when the composite material of the invention is used in wearing circumstances, such as agricultural or mining solutions.

When nitrogen is used as a shielding gas in connection with the method of the invention, it is, if desired, possible to generate a specific gas nitriding so that as illustrated in FIG. 2 the top part of the layer material has a nitride hardening surface having high wear resistance.

The invention claimed is:

1. A component made of a metallic composite material having high corrosion resistance and scale resistance, wherein the metallic composite material comprises as a core material an uncoated hardenable steel on which surface a corrosion resistant and scaling resistant layer is provided using heat resistant stainless steel as a layer material, wherein the core material comprises in mass %: up to 0.48% C, up to 0.4% N, 10.5-18% Cr, up to 8% Ni, up to 18% Mn, up to 3.0% Mo, up to 1.0% Si, up to 0.65% Cu, up to 0.005 B, and the remainder being Fe and inevitable impurities and has a yield strength $Rp_{0.2}$ of at least 1000 MPa and a tensile strength $R_m$ of at least 1500 MPa, and wherein the layer material is austenitic heat resistant stainless steel comprising by mass % 18-25% Cr, 10-19% Ni, Mn≥0.5% and Si≥0.4% or ferritic heat resistant stainless steel comprising by mass % 13-18% Cr, Mn≥0.5%, Si≥1.0% and C≤0.1%.

2. The component according to claim 1, wherein, a ratio of a total thickness of the layer material to a thickness of the core material is at most 0.4.

3. The component according to claim 1, wherein, a ratio of a total thickness of the layer material to a thickness of the core material is at most 0.2.

4. The component according to claim 1, wherein a ratio of a thermal conductivity of the layer material to a thermal conductivity of the core material is at most 2.

5. A method for the manufacture of the component of claim 1, comprising: welding a core material of uncovered hardenable steel and a layer material of heat resistant stainless steel together in order to produce a metallic composite material, wherein the layer material covers outer surfaces of the core material, heat treating the composite material at the austenization temperature for at most 5 minutes, hot forming the heat treated composite material in a hot forming tool to have a desired shape of the component, and cooling the hot formed component to the room temperature.

6. The method according to claim 5, wherein welding is carried out by laser welding.

7. The method according to claim 5, wherein welding is carried out by keyhole welding.

8. The method according to claim 5, wherein hot forming is carried out in an atmosphere comprising at least one shielding gas.

9. The method according to claim 8, wherein nitrogen is used as the shielding gas and a top part of the component has a nitride hardened surface with high wear resistance.

10. The method according to claim 5, wherein the layer material for the composite material of the component is made of austenitic heat resistant stainless steel comprising by mass % 18-25% Cr, 10-19% Ni, Mn≥0.5% and Si≥0.4%.

11. The method according to claim 5, wherein the layer material for the composite material of the component is made of ferritic heat resistant stainless steel comprising by mass % 13-18% Cr, Mn≥0.5%, Si≥1.0% and C≤0.1%.

12. The method according to claim 5, wherein a heating rate during the hot forming process of the composite material is at least 50K/s.

13. The method according to claim 5, wherein the composite material is removed from the hot forming tool during the cooling process when a martensitic start temperature ($M_s$) of the layer material is reached.

14. The method according to claim 5, wherein a connection of the layer material to the core material is achieved by preconditioning the layer material by electrobrightening with an electrolytic solution comprising a 96% sulfuric acid and 85% orthophosphoric acid.

\* \* \* \* \*